No. 746,953.

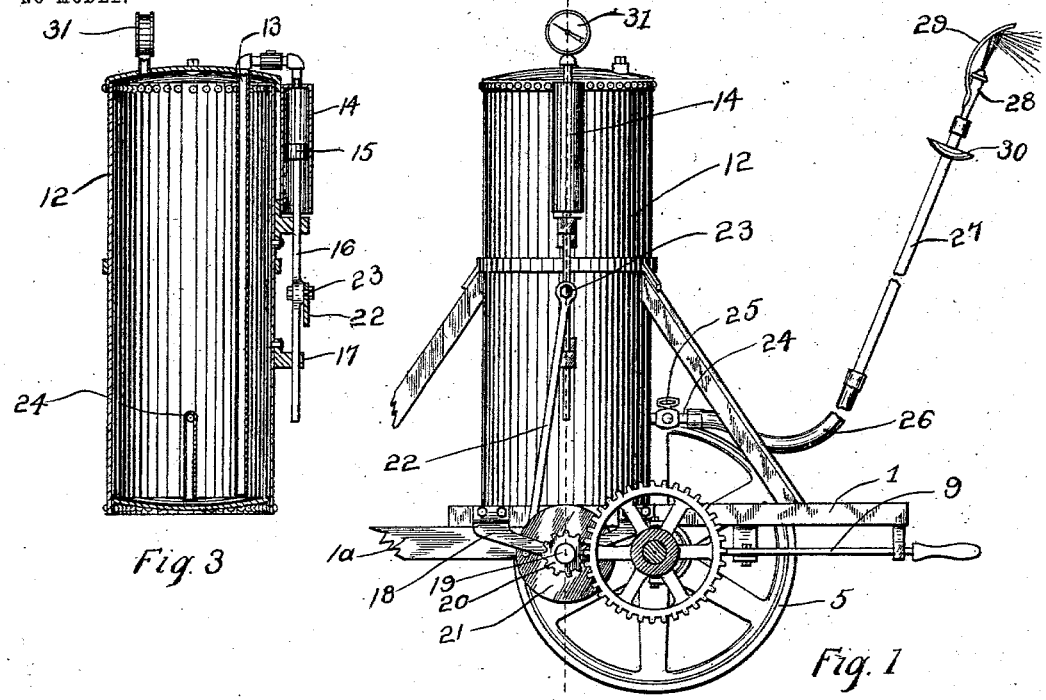

Patented December 15, 1903.

UNITED STATES PATENT OFFICE.

JESSE C. GILL, OF ARNOLD, OHIO.

TREE-SPRAYING MECHANISM.

SPECIFICATION forming part of Letters Patent No. 746,953, dated December 15, 1903.

Application filed June 23, 1902. Serial No. 112,735. (No model.)

*To all whom it may concern:*

Be it known that I, JESSE C. GILL, a citizen of the United States, residing at Arnold, in the county of Union and State of Ohio, have invented a certain new and useful Improvement in Tree-Spraying Mechanism, of which the following is a specification.

My invention relates to the improvement of tree-spraying apparatus; and the objects of my invention are to provide an improved construction of spraying mechanism whereby the pressure on the liquid is attained through the movement of the supporting-truck of the liquid-tank and to so construct my improved apparatus as to permit of the same being thrown out of gear when not in use for generating pressure and to produce other improvements the details of which will be more fully pointed out hereinafter. These objects I accomplish in the manner illustrated in the accompanying drawings, in which—

Figure 1 is a side elevation of my improved spraying apparatus. Fig. 2 is a plan view, and Fig. 3 is a central vertical section, of the tank which I employ in the manner hereinafter described.

Similar numerals refer to similar parts throughout the several views.

In carrying out my invention I employ a suitable truck frame or platform 1, which, as will be evident, may be in the nature of a desirable form of wagon-bed. Journaled transversely beneath the platform or bed 1 in a suitable boxing or bearing 2, connected with said platform, is a transverse shaft 3, and on the outer ends of these shafts are carried ground-wheels 4 and 5. The inwardly-projecting hub portion 6 of the wheel 4 is in the nature of a clutch projection, the toothed end portion of which is adapted to engage corresponding teeth or notches in the outer end of a short clutch-sleeve 7, which is slidably mounted on the shaft 3. The sleeve 7 carries a gear-wheel 8 and also has pivotally connected therewith the bifurcated or yoke-like end of an operating-lever 9, said operating-lever being pivoted or fulcrumed at 10 to a projection 11 of the frame or platform 1.

Upon the platform or frame 1 I support vertically a liquid-holding tank 12 of suitable dimensions. Leading into the tank 12 through the upper side thereof is an air-inlet pipe 13, the lower end of this pipe being, as shown in Fig. 3 of the drawings, adjacent to the bottom of the tank. The upper and outer end portion of the pipe 13 is suitably connected with the upper end of an air-pump cylinder 14, said cylinder preferably being supported, as shown, adjacent to the outer side of the tank 12 and parallel therewith. Within the air-pump cylinder is a piston 15, which is carried on the end of a piston-rod 16, which extends downward through the lower end of the cylinder 14 and works in a suitable guide projection 17 on the outer side of the tank 12. Mounted in a bracket 18, which projects laterally from the platform 1, is a short shaft 19, on the outer end of which is carried a comparatively wide pinion 20, with the teeth of which is adapted to gear or mesh the teeth of the gear-wheel 8. On the inner end of the shaft 19 is carried a disk 21, and with this disk is pivotally and eccentrically connected the lower end of a connecting or driving rod 22. The rod 22 has its upper end pivotally connected with the piston-rod 16, as indicated at 23. Leading outward from the lower portion of the tank 12 is a liquid-conducting outlet-pipe 24, the latter having its lower termination adjacent to the bottom of the tank and being provided on the outer side of the tank, as indicated in Fig. 1, with a suitable valve 25. With this pipe 24 is connected a desirable length of flexible hose 26 and with the latter a nozzle-pipe 27, which terminates in a suitable form of spray-nozzle 28. Affixed to one side of the nozzle 28 is the lower portion of an outwardly-extending and inwardly-curved spraying-plate 29, the outer termination of which is over the outlet of the nozzle 28. Secured upon the nozzle-pipe 27 in rear of the nozzle 28 is a convex disk or shield 30. As indicated at 31, I may provide the upper end of the tank 12 with a suitable pressure-gage, and, as shown, the platform or frame 1 may have connected therewith in any desirable manner a suitable form of tongue 1ª.

In utilizing my invention the tank 12 is partially filled with the liquid which is to be used for spraying the leaves and branches of trees. Assuming that the lever 9 is in the position shown in Fig. 2 of the drawings—that is, in such position as to cause engagement of the clutch-sleeve 7 with the clutch projection 6—it will be understood that the rotary movement of the ground-wheels produced in the traveling movement of the truck to the point at which the same is to be used will result, through the gear connections described, in a rotary movement of the shaft 19 and disk 21 and in a consequent reciprocating motion of the rods 22 and 16. This reciprocating motion of the piston-rod 16 results in the usual manner in such operation of the air-pump as to force air into the tank through the pipe 13. The air thus introduced into said tank under pressure is delivered, as shown, at or adjacent to the bottom of the tank, with the result that in rising to the top of the liquid contained therein the air serves to produce a desirable agitation of said liquid and a consequent mingling or mixture of the ingredients contained in said liquid. The air thus introduced into the tank places the liquid therein under pressure, and when the valve 25 is opened the liquid is thus forced outward through the pipe portions 26 and 27 and nozzle 28 against the plate 29, which results in deflecting the spray laterally. In order to prevent the spray or any portion thereof coming into contact with the hands and garments of the operator, I provide the disk 30, which serves to shield the hand and arm of the operator. It is obvious that as the tank-bearing truck is moved from tree to tree additional supplies of compressed air are provided within the tank and that in case a sufficient air-pressure has been generated within said tank the lever 9 may be so thrown as to disengage the clutch-sections 6 and 7 and permit the movement of the wheels 4 and 5 without operation of the air-pump. Owing to the double width of the pinion 20, it will be observed that this pinion will at no time be out of gear with the gear-wheel 9.

From the construction herein shown and described it will be seen that a simple, reliable, and effective mechanism is provided whereby trees may be readily sprayed for the purpose of protecting the same against damage by worms or insects.

Having now fully described my invention, what I claim, and desire to secure by Letters Patent, is—

In an apparatus of the character described, the combination with a truck-frame, and axle therefor and ground-wheels upon the axle, one of the wheels having a clutch member, of a gear slidably mounted upon the axle and having a clutch member for engagement with the clutch member of said ground-wheel, a lever intermediately fulcrumed upon the truck and having a swiveled connection with the gear, a counter-shaft mounted upon the frame, a pinion upon the counter-shaft and in mesh with the gear, a crank-disk carried by the counter-shaft, a tank upon the truck, an upright pump-cylinder carried by the tank, a piston within the cylinder, a piston-rod piercing the bottom of the cylinder and working in guides upon the tank, a connecting-rod between the crank-disk and the piston-rod, an air-pipe leading from the top of the pump-cylinder through the upper portion of the tank to the bottom thereof, an outlet-pipe leading from the lower portion of the tank and provided with a valve, a flexible pipe connected to the valved pipe, and a spray-nozzle carried by the flexible pipe.

JESSE C. GILL.

In presence of—
C. C. SHEPHERD,
W. L. MORROW.